United States Patent [19]

Thornton

[11] 4,029,983
[45] June 14, 1977

[54] METAL-HALIDE DISCHARGE LAMP HAVING A LIGHT OUTPUT WITH INCANDESCENT CHARACTERISTICS

[75] Inventor: William A. Thornton, Cranford, N.J.

[73] Assignee: Westinghouse Electric Corporation, Pittsburgh, Pa.

[22] Filed: Mar. 25, 1976

[21] Appl. No.: 670,490

[52] U.S. Cl. .............................. 313/25; 313/184; 313/229; 313/487

[51] Int. Cl.² .................. H01J 61/18; H01J 61/34; H01J 61/44

[58] Field of Search ........... 313/487, 486, 25, 184, 313/229

[56] References Cited

UNITED STATES PATENTS

| | | | |
|---|---|---|---|
| 3,821,577 | 6/1974 | Larson | 313/486 X |
| 3,825,792 | 7/1974 | Rokosz et al. | 313/487 |
| 3,866,083 | 2/1975 | Datta et al. | 313/487 |

*Primary Examiner*—Palmer C. Demeo
*Attorney, Agent, or Firm*—D. S. Buleza

[57] ABSTRACT

The light output of a high-pressure metal-halide lamp that employs a sodium-scandium discharge and has an efficacy of approximately 90 lumens per watt is selectively modified by a luminescent coating on the inner surface of the outer envelope to provide color rendering and a source-color that are similar to those of an incandescent type lamp. The luminescent coating comprises a blend of two selected phosphor materials, one of which absorbs and is excited by blue-violet radiations produced by the arc discharge and emits in the green portion of the spectrum, and the other of which absorbs and is excited by the violet to yellow band of radiations produced by the arc discharge and emits in the red portion of the spectrum. The desired color rendering and reduction in the color temperature (from about 3600K to about 2800K) are achieved with a minimum drop in efficiency by using a luminescent coating consisting of approximately equal amounts (by weight) of green-emitting CaS:Ce phosphor and red-emitting CaS:Eu phosphor. Various other combinations of phosphors are also disclosed.

17 Claims, 4 Drawing Figures

METAL-HALIDE DISCHARGE LAMP HAVING A LIGHT OUTPUT WITH INCANDESCENT CHARACTERISTICS

BACKGROUND OF THE INVENTION

1. Field of the Invention

This invention generally relates to electric lamps and has particular reference to an improved high-pressure metal-halide discharge lamp having integral means for modifying the color-rendering characteristics and chromaticity of its light output.

2. Description of the Prior Art

High-pressure discharge lamps which utilize mercury and various metal-halides in the arc tube to provide an efficient light source are disclosed in U.S. Pat. No. 3,234,421 issued Feb. 8, 1966 to G. H. Reiling. A lamp of this type which provides a light output of improved color by dosing the arc tube with mercury, a halogen such as iodine, an alkali metal such as sodium, and scandium (either alone or together with thorium) is described in U.S. Pat. No. 3,407,327 issued Oct. 22, 1968 to F. Koury et al.

According to a more recent improvement in the art, the spectral emission of a high-pressure mercury discharge lamp is modified to provide a light output which is similar to that of an incandescent lamp by first coating the inner surface of the outer protective envelope with a non-luminescent material (such as silica, titania, magnesia, alumina or mixtures thereof) and then with a phosphor mixture containing selected amounts yttrium vanadate phosphor (or yttrium phosphate-vanadate phosphor) and a second phosphor such as magnesium fluoro-germanate or magnesium arsenate phosphor. A lamp of this type is disclosed in U.S. Pat. No. 3,825,792 issued July 23, 1974 to F. Rokosz et al.

Color-correction of a high-pressure mercury vapor lamp by blending a green-emitting phosphor (strontium chlorosilicate activated by divalent europium) with a red-emitting phosphor (such as yttrium vanadate phosphate activated by europium) and coating the inner surface of the protective envelope with the resulting mixture to convert ultraviolet radiations into visible radiations of the respective colors is disclosed in U.S. Pat. No. 3,866,083 issued Feb. 11, 1975 to R. K. Datta et al.

While metal-halide discharge lamps, especially those employing sodium and scandium in the arc tubes, provide important advantages in commercial lighting applications since their efficacy is higher than that of conventional mercury-vapor lamps, the spectral distribution of their light output is such that the color of articles illuminated by these lamps is distorted to such an extent that the lamps cannot be used for lighting department stores and the like where color rendition is very important to the customer as well as successful merchandising. It would accordingly be very desirable to provide a light source having the high efficacy of a metal-halide type discharge lamp but a source-color and color-rendition characteristics that are similar to those of an incandescent lamp.

SUMMARY OF THE INVENTION

The foregoing objectives and advantages are achieved in accordance with the present invention by coating the inner surface of the protective outer envelope of a metal-halide discharge lamp with a blend of two or more selected phosphors that absorb and are excited by visible radiations generated by the arc tube and convert them into green and red radiations. The coating of admixed phosphors not only decreases the color temperature of the lamp but effects an improvement in color rendering such that the light output of the modified lamp is very similar to that of an incandescent lamp.

In accordance with a preferred embodiment, the arc tube of a sodium-scandium discharge lamp of the type presently being marketed and used for outdoor lighting applications is enclosed by an outer envelope whose inner surface is coated with a mixture of green-emitting CaS:Ce phosphor and red-emitting Cas:Eu phosphor (in a 1:1 ratio by weight). The resulting color-modifying luminescent coating reduces the color temperature of the sodium-scandium discharge from about 3500–3900 Kelvin (K) to about 2700–3100K and provides a light output that is very similar to that of an incandescent lamp with respect to the rendition of the hue and saturation of the colors used in such articles as towels, draperies, etc.

The color-rendering properties of the improved lamp are enhanced by the fact that the aforementioned phosphors used in the light-modifying coating absorb and are excited by blue-violet and yellow radiations which are produced by the arc tube and aggravate the color-distortion problem. The coloration of rugs, fabrics and similar merchandise that is illuminated by the improved lamp is thus pleasing and satisfying to the eye, particularly in comparison to that of other types of color-corrected high-intensity discharge lamps presently being marketed. In contrast to high-pressure mercury-vapor lamps which make gold colored articles appear yellow-green and blue colored articles appear violet, the modified lamp of the present invention renders both of these colors in a very satisfactory manner.

The efficacy of the color-modified sodium-scandium discharge lamp is in the range of approximately 75 to 80 lumens per watt. The invention accordingly provides a light source that combines the features of good color-rendering and high efficacy with the source color and color-rendering characteristics of an incandescent lamp. The improved lamps can thus be used with great advantage in the lighting of department stores and the like, as well as other lighting applications where the color-rendering characteristics of an incandescent lamp are desired and energy costs are a factor.

BRIEF DESCRIPTION OF THE DRAWINGS

A better understanding of the invention will be obtained from the exemplary embodiment shown in the accompanying drawings, in which.

DESCRIPTION OF THE PREFERRED EMBODIMENTS

While the present invention can be employed in various types of metal-halide discharge lamps and in lamps of various sizes and wattage ratings, it has been reduced to practice by modifying sodium-scandium discharge lamps of 400 watt rating and the invention has been so illustrated.

Figure 1:
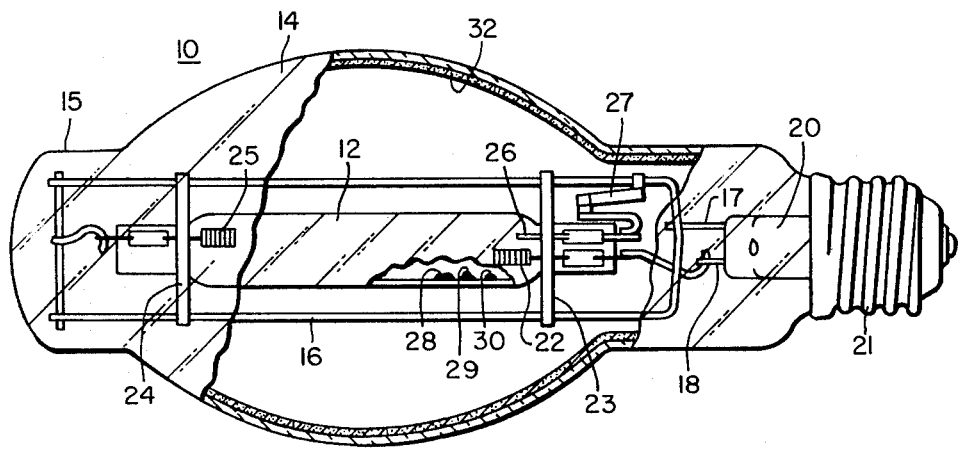
FIG. 1 is a side elevational view of a metal-halide discharge lamp embodying the present invention, a portion of the outer envelope and arc tube being broken away for illustrative purposes.

In FIG. 1 there is shown a representative high-pressure metal-halide discharge lamp 10 which embodies the present invention and comprises the usual arc tube 12 that is supported within a larger protective or outer envelope 14. The arc tube 12 is composed of a suitable high-temperature material such as fused silica (quartz) and is held in centrally-located position within the outer envelope 14 in the usual fashion by means of a metal support-harness or frame 16 that is fastened to a lead wire 17 anchored in a glass stem 20 which is sealed to the envelope neck. A second lead wire 18 is embedded in the stem and, as illustrated, is electrically connected to one of the arc tube electrodes 22 by a suitable conductor that is fastened to a lead-in assembly embedded in the press seal formed at that end of the arc tube 12. The support frame 16 extends along the sides of the arc tube 12 and its inner end nests within the tubular domed end 15 of the outer envelope 14. The arc tube 12 is mechanically locked within the support frame 16 by suitable metal straps 23 and 24 that are fastened to the side members of the frame and engage the press seals on the ends of the arc tube 12. The metal frame 16 is electrically connected to the other main electrode 25 of the arc tube 12 by a suitable conductor that is fastened to the lead-in assembly embedded in the associated press seal. A starting electrode 26 at the opposite end of the arc tube 12 is connected by another lead-in assembly and conductor to a starting resistor 27 that is connected to the adjacent side portion of the support frame 16 in the usual fashion. The lead wires 17, 18 are connected to a suitable base 21 that is cemented to the sealed end of the envelope 14.

The arc tube 12 contains predetermined amounts of mercury 28, sodium 29 and scandium 30 and is charged with a suitable starting gas such as argon at a suitable pressure. The arc tube 12 may also contain a small amount of thorium, if desired. The ionizable fill within the arc tube also includes a halogen such as iodine, bromine or chlorine.

Metal-halide discharge lamps having arc tubes which contain the foregoing components and provide a sodium-scandium discharge are well known in the art and are presently being marketed. However, such lamps are not suitable for lighting the interior of stores and the like since the sodium-scandium discharge generally has a color temperature of approximately 3500 to 3900 K and has a light output which is too rich in the blue-violet and yellow portions of the spectrum. As a result, the color rendition of unmodified sodium-scandium discharge lamps and other types of metal-halide lamps is very poor and produces visual distortions that are intolerable in indoor lighting applications such as stores where merchandising is involved and the coloration of the displayed articles is critically important to the customer.

Figure 2:
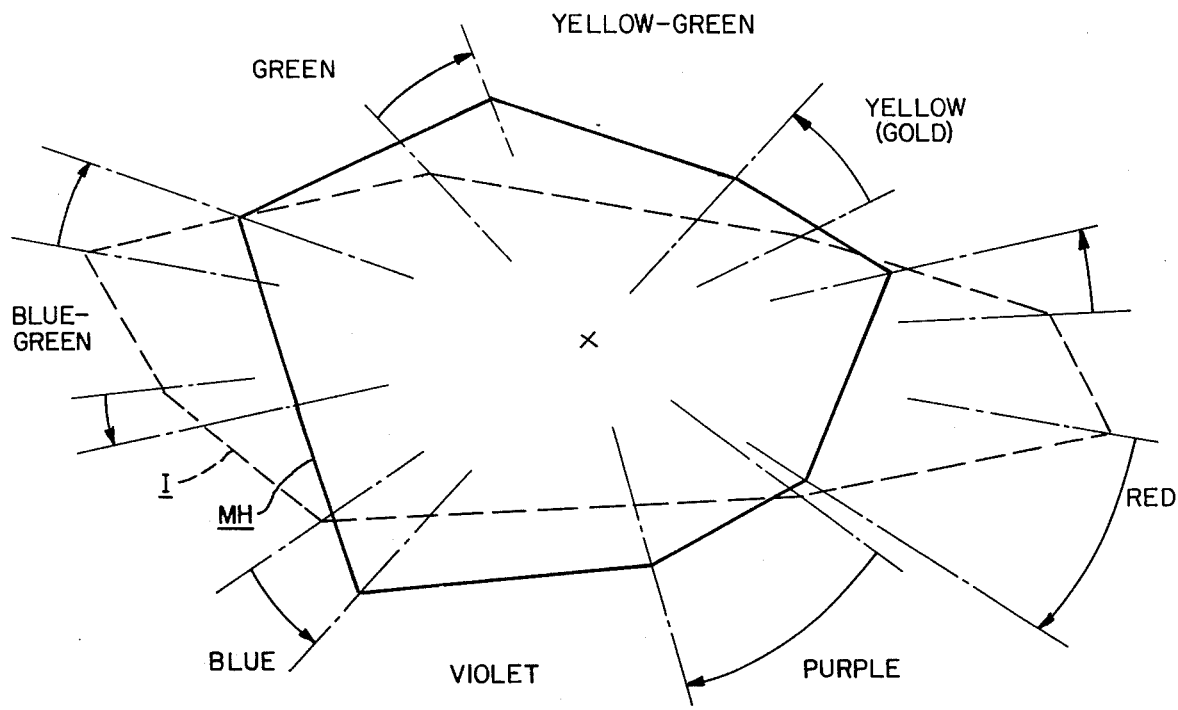
FIG. 2 is a color diagram comparing the gamut of coloration of the eight CIE test-colors as rendered by an uncorrected 3600K metal-halide lamp and by an incandescent lamp source at a color temperature of about 2800K.

The differences in the color-rendition of objects illuminated by prior art sodium-scandium discharge lamps and by an incandescent lamp having a color temperature of about 2800K is graphically illustrated in FIG. 2. The gamut of coloration of the eight CIE test colors in the $u$-$v$ diagram obtained with the unmodified 3600K sodium-scandium dishcarge lamp is indicated by the octagon MH defined by the solid line and the gamut of coloration of the same test colors produced by an incandescent lamp operated at its normal color temperature of about 2800K is depicted by the octagon I defined by the broken line. As indicated by the arrows, the color-rendering of the unmodified sodium-scandium discharge lamp (compared to that of the incandescent lamp) causes the reds to be shifted strongly toward the pale purple, shifts the purples and blues toward the violet, and shifts the golds and greens toward the yellow-green. It also shifts complexion colors towards the pale yellow.

The use of such color diagrams and octagons to portray the color-rendering characteristics of various light sources is well known in the art. The various octagons or gamuts of coloration are produced by using the eight CIE test-colors specified in the CRI procedures (as set forth in the publication of the International Commission of Illumination, identified as publication CIE No. 13,E-1.3.2, 1965). The eight test colors are illuminated by the light source being evaluated, the chromaticities are plotted on the color diagram and lines are drawn connecting the adjacent points to produce the octagon which is characteristic for that light source. The use of $u, v$ color diagrams and the manner in which they are to be interpreted are described in the publication entitled "Projective Transformations of ICI Color Specifications" by D. L. MacAdam in the Journal of the Optical Society of America, Vol. 27, page 294, 1937.

In accordance with the present invention, the color distortion of the prior art sodium-scandium type metal-halide discharge lamps is drastically reduced by the use of selected phosphors that are incorporated as integral components of the lamp and convert visible radiation in certain undesirable wavelength regions produced by the discharge into visible radiations in different wavelength regions which improve color rendition. A study of the spectral emission characteristics of prior art sodium-scandium lamps has revealed that the color-rendering properties and chromaticity of the light output of such lamps can both be enhanced by reducing the amount of blue and violet radiations and increasing the green and red components—without adding any yellow light, which should be scrupulously avoided because of its deleterious effect on color-rendering.

It was discovered that such adjustments could be achieved by means of two phosphors, one which absorbs and is excited by violet-blue light to emit in the green portion of the spectrum and the other of which also absorbs and is excited by violet-blue radiations and emits in the red portion of the spectrum. In accordance with a preferred embodiment, the green emitting phosphor is $CaS:Ce^{3+}$ and the red-emitting phosphor is $CaS:Eu^{2+}$. The trivalent cerium activates the green emission and the divalent europium activates the red emission. A lead coactivator can be used to provide long-wave-ultraviolet excitability in one or both phosphors, which is a desirable characteristic since the sodium-scandium discharge is weak in short-wave ultraviolet radiation. The red-emitting CaS:Eu phosphor has the additional advantageous characteristic that it absorbs some of the yellow light from the arc discharge and converts it into red radiations which are needed to reduce color distortion.

The aforesaid phosphors are blended together and applied as a single coating 32 of luminescent material on the inner surface of the transparent outer envelope 14 of the discharge lamp 10, as shown in FIG. 1. The phosphors are mixed with a suitable binder and liquid vehicle to form a slurry or paint which is deposited on the inner surface of the envelope 14 to form a coating of uniform thickness which is then dried and lehred in the usual fashion. As a specific example, in the case of the 400 watt sodium-scandium type discharge lamp shown in FIG. 1 having a "BT37" type outer bulb with an inner surface area approximately 650 square centimeters, a blend containing equal amounts (by weight) of cerium-activated calcium sulfide phosphor and europium-activated calcium sulfide phosphor was prepared and 700 milligrams of the resulting phosphor blend was uniformly coated onto the bulb surface to provide a luminescent coating that contained approximately 1 milligram of phosphor per square centimeter of bulb surface. The light-filtering and radiation-conversion properties of this coating were such that the color temperature of the lamp was reduced to about 2800K and provided a light output whose chromaticity and color-rendering characteristics were very similar to that of an incandescent lamp source of the same color temperature.

Figure 3:
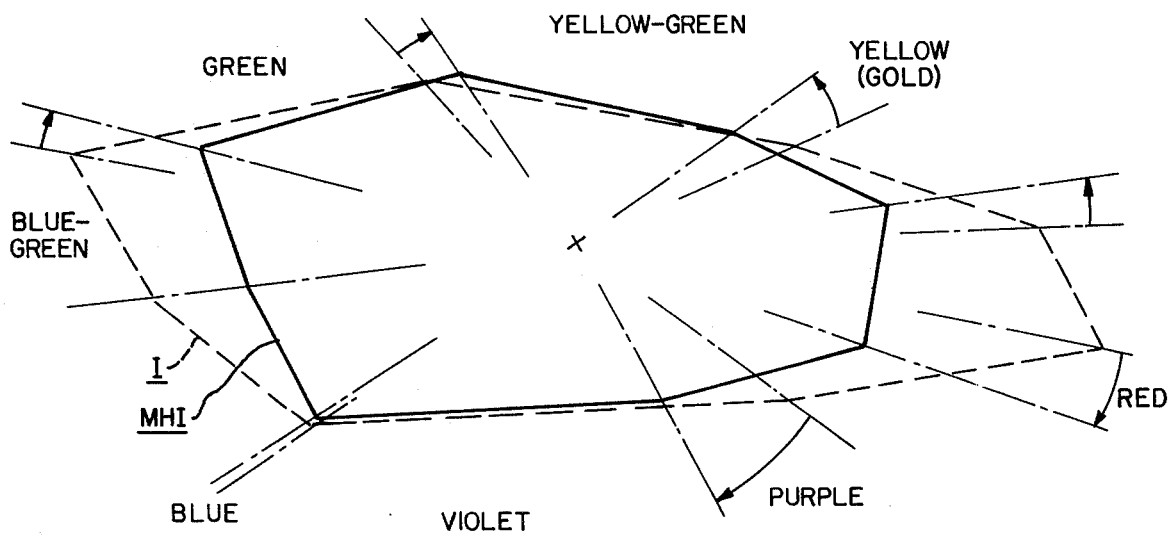
FIG. 3 is a similar graph comparing the gamut of coloration of the eight CIE test-colors as rendered by a modified metal-halide lamp having a color temperature of 2800K and the gamut of coloration obtained with an incandescent lamp source at the same color temperature.

These characteristics are shown graphically in FIG. 3. As will be noted, the octagon MHI depicting the gamut of coloration for the eight CIE test-colors illuminated by the color-modified sodium-scandium discharge lamp closely matches the octagon I depicting the color-rendering characteristics of an incandescent lamp which has a color temperature of about 2800K. As will be noted, the hue-shifts in each of the color regions are drastically reduced and the rendition of colors in all regions, particularly in the gold and blue, are very much improved. Complexion colors are also improved. These results were verified visually by expert observers using human subjects and selected articles such as fabrics, rugs, etc. that included various colors including gold and blue.

The efficiency of the modified lamp 10 ranges from 75 to 80 lumens per watt, depending upon the emission spectra and efficiency of the particular arc tube and the amount of phosphor-blend coated onto the outer envelope. This compares to about 16 lumens per watt for an incandescent lamp of the size which would be replaced by the improved discharge lamp of the present invention.

The aforementioned cerium-activated and europium activated calcium sulfide phosphors are well known in the art and are described in U.S. Pat. No. 3,898,174 issued Aug. 5, 1975 to Willi Lehmann, and in Lehmann's articles entitled "The Cathodoluminescence of $CaS:Ce^{3+}$ and $CaS:Eu^{2+}$ Phosphors", Journal of the Electrochemical Society, Vol. 118, March 1971, pages 477–482; and "Activators and Coactivators in Calcium Sulfide Phosphors", Journal of Luminescence, Vol. 5, May 1972, pages 87–107.

Figure 4:
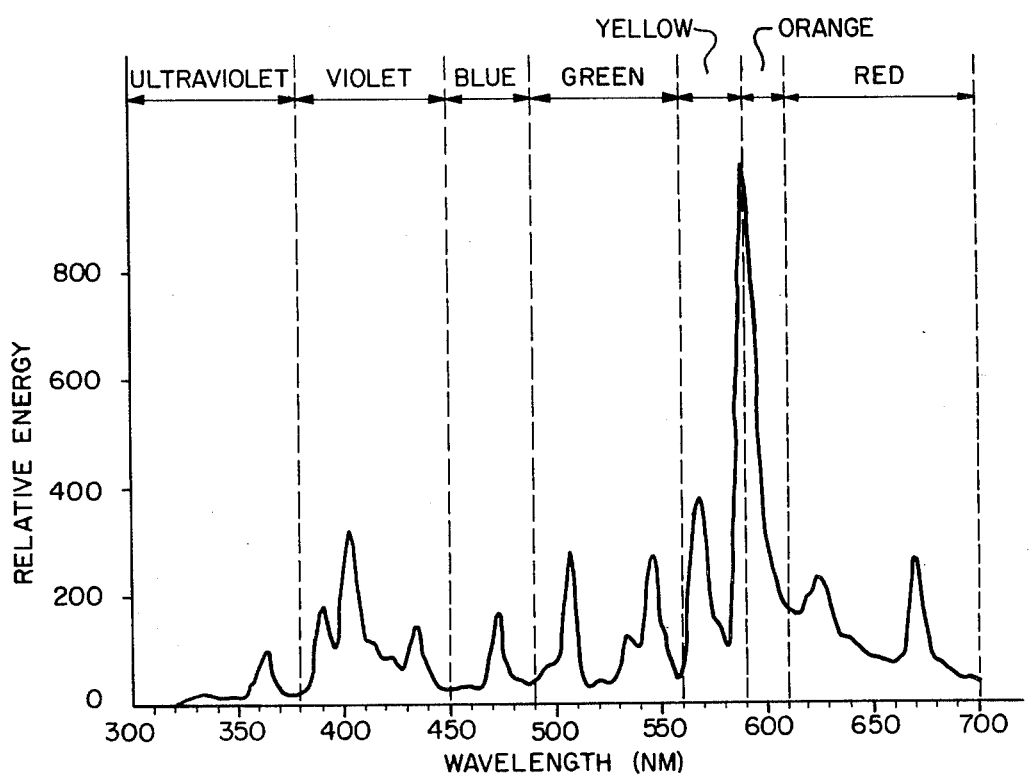
FIG. 4 is a graph illustrating the spectral power distribution of the light output from the improved lamp.

The blend of the two phosphors used in the specific lamp embodiment described above absorbed visible radiations in the 380 to 490 nanometer (nm.) wavelength region and 560–590 nm wavelength region (blue-violet and yellow regions, respectively) produced by the sodium-scandium arc discharge and converted them into visible radiations in the 490–560 nm wavelength region and 610–700 nm wavelength region (green and red portions of the spectrum, respectively). The resultant spectral distribution of the improved lamp 10 is shown in FIG. 4. As will be noted, the light output of the color-modified lamp has a stronger green than blue component and is rich in orange-red radiation.

The aforementioned 1:1 ratio of the CaS:Ce and CaS:Eu phosphors used in the specific embodiment is not critical and can be varied depending upon the precise excitation and emission spectra of the phosphors, the actual color temperature or chromaticity of the discharge, and the degree of color rendering desired. For example, if the green-emitting phosphor were less efficient and the red-emitting phosphor more efficient, then the weight ratio of green-emitting phosphor to red-emitting phosphor would be greater than 1. The ratio would also vary somewhat if the color temperature of the sodium-scandium discharge were higher or lower than 3600K and if the desired color temperature were higher or lower than 2800K. The ratio of CaS:Ce to CaS:Eu in the phosphor-blend or luminescent coting can thus range from about 3:1 to 0.3:1, on a weight basis.

The amount of radiation-conversion, or transformation required to achieve the desired balance of spectral colors in the light output, and thus the relative amounts of the individual phosphors in the blend, will also vary if the color temperture of the discharge is altered by varying the proportions of sodium to scandium used in the arc tube. For example, if the ratio of sodium to scandium, on a weight basis, were 10:1 then the color temperature of the discharge would be in the order of 4500K. However, the color temperature of the arc discharge could be lowered to approximately 3200K by utilizing a sodium to scandium ratio of approximately 50:1 (by weight). Hence, by changing the color temperature of the arc discharge through the use of the proper amounts of sodium and scandium in the arc tube and correlating such parameters with the relative amounts of the two phosphors in the luminescent coating, the color-rendering characteristics and color temperature of the lamp can be modified in a predictable manner within a rather wide range.

The arc tube in the specific lamp embodiment described above was dosed with approximately 52 milligrams of mercury, 7.5 milligrams of mercuric iodide, 2 milligrams of scandium and 45 milligrams of sodium iodide and was filled with 20 torr of argon. Chlorine or bromine could also be used as the halogen and selected small amounts of thorium could be included in the ionizable fill.

The green-emitting and red-emitting calcium sulfide phosphors employed in the above-described 400 watt lamp embodiment were prepared as follows: 300 grams of calcium carbonate were mixed with 500 milligrams of $CeO_2$ (or 500 milligrams of $Eu_2O_3$ in the case of the red-emitting phosphor) and the resulting mixture fired in an open boat at a temperature of approximately 1100° C for one-half hour in a nitrogen atmosphere, and then for an additional hour in a hydrogen sulfide atmosphere. The resulting composition was powerdized and mixed with 690 milligrams $Pb_3O_4$, 15 grams of $NH_4Cl$ and about 10 grams of sulfur and fired in capped tubes at 1100° C for 1 hour in a nitrogen atmosphere. The resulting material was powerdized, milled in a Waring Blendor in a $NH_4F$-alcohol solution for 30 seconds, washed in methyl alcohol several times, dried in a vacuum funnel over a paper filter and then in open air, and finally passed through a 400 mesh screen.

ALTERNATE EMBODIMENTS

Satisfactory color-rendering by sodium-scandium discharge lamps (and other types of metal-halide lamps) pursuant to the invention can also be obtained by coating the outer envelope with blends of other suitable red-emitting and green-emitting phosphors which will form a luminescent layer capable of effecting the proper conversion or transformation of the radiant energy emitted by the arc tube. Examples of suitable green-emitting phosphors are copper-activated zinc silicate. Examples of suitable red-emitting phosphors are europium-activated yttrium vanadate, europium-activated strontium sulfide, and europium-activated yttrium vanadate phosphate.

The luminescent coating 32 can comprise a blend of a single red-emitting phosphor and a single green-emitting phosphor, as in the specific embodiment—or the red-emitting constituent of the blend can consist of a mixture of two or more of any of the disclosed red-emitting phosphors, and the green-emitting constituent a mixture of two or more of any of the disclosed green-emitting phosphors.

Each of the above-mentioned alternative phosphors are well known to those skilled in the art and their characteristics and the manner of making them are described in various articles and publications. For example, the yttrium vanadate and yttrium vanadate phosphate phosphors are discussed by T. W. Luscher and R. K. Datta in the January 1970 issue of "Illuminating Engineering" (Vol. 65, No. 1, pp 49–53).

Zinc sulfide and zinc silicate phosphors were discovered many years ago and have been described in many textbooks and papers.

I claim as my invention:

1. A high-pressure metal-halide discharge lamp comprising;
    an arc tube of fused silica containing mercury, sodium, a halogen, scandium, and an ionizable fill gas,
    a light-transmitting outer envelope surrounding said arc tube,
    means supporting said arc tube in predetermined spaced-apart relationship with said outer envelope, and
    means for modifying the color-rendering characteristics and chromaticity of the light generated by the arc tube, when said lamp is energized, comprising a coating on the interior surface of the outer envelope that luminesces in response to impinging radiations emitted by said arc tube,
    said luminescent coating comprising a blend of green-emitting material and red-emitting material,
    said green-emitting material being at least one phosphor of the group consisting of copper-activated zinc sulfide, zinc silicate and cerium-activated calcium sulfide, and
    said red-emitting material being at least one phosphor of the group consisting of europium-activated yttrium vanadate, europium-activted strontium sulfide, europium-activated calcium sulfide and europium-activated yttrium vanadate phosphate.

2. The metal-halide discharge lamp of claim 1 wherein said halogen is iodine and said fill gas is argon.

3. The metal-halide discharge lamp of claim 1 wherein said coating of luminescent material comprises a mixture of green-emitting cerium-activated calcium sulfide and red-emitting europium-activated calcium sulfide.

4. The metal-halide discharge lamp of claim 3 wherein;
    the color temperature of the sodium-scandium discharge within the arc tube, when the lamp is energized and operating in a stabilized mode, is within the range of from about 3200K to 4500K, and
    the ratio of CaS:Ce to CaS:Eu in said mixture is in the range of from 3:1 to 0.3:1 on weight basis.

5. The metal-halide discharge lamp of claim 1 wherein the relative quantities of sodium and scandium present within the arc tube are such that the ratio of sodium to scandium, on a weight basis, is within the range of from about 10:1 to 50:1.

6. The metal-halide discharge lamp of claim 5 wherein said coating of luminescent material comprises a mixture of CaS:Ce, Pb, Cl phosphor and CaS:Eu, Pb, Cl phosphor.

7. The metal-halide discharge lamp of claim 6 wherein;
    the ratio of sodium to scandium is such that the color temperature of the sodium-scandium discharge is within the range of from about 3500K to 3900K, and
    the ratio of the said two admixed phosphors is approximately 1:1 on a weight basis.

8. A high-pressure metal-halide discharge lamp comprising the combination of;
    a radiation-transmitting arc tube that contains a pair of spaced electrodes, a starting gas, and an ionizable medium that includes mercury and a selected metal halide which coact, when the lamp is energized, to sustain an arc discharge which has a color temperature in excess of 3100K and produces light that includes radiations in the blue-violet region of the spectrum which are of such intensity that they impair the color-rendering characteristics of the lamp,
    conductor means for connecting said arc tube to a source of electric power,
    an outer envelope of light-transmitting material surrounding said arc tube;
    means supporting said arc tube in predetermined position within the outer envelope, and
    luminescent material on the inner surface of said outer envelope that absorbs blue-violet radiations generated by the arc tube, when the lamp is energized, and converts said absorbed radiations to radiations in the green and red regions of the spectrum,
    the radiation-conversion characteristics of said luminescent material being so correlated with respect to (a) the mercury and metal halide components of the arc tube and (b) the radiation-generating characteristics and color temperature of the discharge which is sustained by said arc tube that the lamp, when operating and stabilized, has a color temperature of from about 2700K to 3100K and a light output which has color-rendering properties similar to those of an incandescent lamp source.

9. The metal-halide discharge lamp of claim 8 wherein;
    the ionizable medium within said arc tube includes predetermined amounts of scandium and sodium which produce a sodium-scandium discharge during stabilized lamp operation, and said luminescent material absorbs blue-violet radiation in the wavelength region of approximately 380 to 490 nm. which are generated by said arc tube and converts such absorbed blue-violet radiations into (a) green radiations in the wavelength region of approximately 490 to 560 nm. and (b) red radiations in the wavelength region of approximately 610 to 700 nm.

10. The metal-halide discharge lamp of claim 9 wherein said luminescent material also absorbs yellow radiations in the wavelength region of approximately 560 to 590 nm. and converts such absorbed yellow radiations into red radiations.

11. The metal-halide discharge lamp of claim 9 wherein said luminescent material comprises a substantially uniform coating of admixed phosphors that extends over substantially the entire inner surface of the outer envelope.

12. The metal-halide discharge lamp of claim 9 wherein;

said luminescent material comprises a substantially uniform coating of two admixed phosphors, one of which emits greed radiations and the other which emits red radiations, and the color temperature of the sodium-scandium discharge within the arc tube, when the lamp is energized and has achieved stable operation, is at least 3200K.

13. The metal-halide discharge lamp of claim 12 wherein said green-emitting phosphor is cerium-activated calcium sulfide and said red-emitting phosphor is europium-activated calcium sulfide.

14. The metal-halide discharge lamp of claim 12 wherein said green-emitting phosphor is $CaS:Ce^{3+}$, Pb, Cl and said red-emitting phosphor is $CaS:Eu^{2+}$, Pb, Cl.

15. The metal-halide discharge lamp of claim 14 wherein the color temperature of the sodium-scandium arc discharge is 3500K to 3900K.

16. The metal-halide discharge lamp of claim 15 wherein;

said coating of admixed phosphors extends over substantially the entire inner surface of the outer bulb, and the relative amounts of said phosphors in the coating are such that the color temperature of the lamp is in the range of about 2700K to 3100K, when the lamp is energized and operating in a stabilized manner.

17. The metal-halide discharge lamp of claim 16 wherein the coating contains approximately equal amounts of said phosphors.

* * * * *